Dec. 29, 1942.　　G. C. WILHIDE　　2,306,769
PORTABLE ELECTRIC TOOL MOTOR CONSTRUCTION
Filed Feb. 18, 1941

Inventor
Glenn C. Wilhide
By Edwin F. Samuels
Attorney

Witness

Patented Dec. 29, 1942

2,306,769

UNITED STATES PATENT OFFICE 2,306,769

PORTABLE ELECTRIC TOOL MOTOR CONSTRUCTION

Glenn C. Wilhide, Baltimore County, Md., assignor to The Black and Decker Manufacturing Company, Towson, Md., a corporation of Maryland Application February 18, 1941, Serial No. 379,413

8 Claims. (Cl. 172—36)

The invention relates to the construction of portable electric tools and particularly to the motor housing or field casing and stator and the manner of mounting and securing the stator to overcome existing defects and causes of failure. The motors of these tools, due to the limitations imposed by the conditions incident to use of the tools, both for portability and for convenience in operating in confined spaces, must be as small, compact and light as the power, speed, rigidity and durability requirements will permit. In motors of the three-phase type and other motors made to meet these conditions there is insufficient room for screws and similar fastening means passing through the laminations of the stator iron or field core in the direction of the motor axis, which is a usual construction in motors for other purposes where a lesser degree of compactness is required.

On account of this difficulty, it has been customary in the construction of small portable electric tool motors of this type to fasten the stator iron or field core by means of set screws extending through the motor casing and threaded into the stator iron. Such screws have been radially disposed and located at various points.

On account of the very slight depth of stator iron available for this purpose in these small motors, a minute threaded area is available for engagement by these screws, further this engagement is insecure because of the thin laminations of which the stator iron is composed and the construction suggested is not satisfactory because the screws tend to back out when subject to the vibration incident to motor and tool operation. If the radial holes be extended to give sufficient threaded area for secure engagement by the screws, the holes tend to enter the winding with consequent injury to and shorting of the winding.

An improved construction which tends to overcome some of the difficulties incident to the use of set screws provides or includes keys laid in the surface of the stator iron and also seated in the casing to prevent rotation of the stator, the keys having a hook at one end to hook over the edge of the stator irons and being threaded at the other end for engagement by a nut whereby the core is drawn up tightly against a stop or supporting surface. While this construction represents an advance over the previous ones it has features which at times contribute to failure. If any one of the nuts is left loose so that it backs off, the key thus released may drop down into the fan with resulting damage to the fan or the winding. In some instances the keys are brittle due to improper treatment in manufacture and the hook portion may break off or a nut may be drawn up too tightly causing the same result, i. e., breaking of a hook.

The tools are ordinarily operated with the chuck and bit and gear casing disposed downwardly and there is a constant tendency for any of the motor parts which may be in any way released to drop down into the fan with consequent injury to the fan or to the winding. In these constructions if the fastenings are sufficiently loosened the stator tends to slip down and come into contact with the fan with the result that the windings are damaged and the motor requires major repairs in the nature of the replacement of the windings.

The construction is easy to disassemble and service and the stator is so secured that there is little, if any, tendency for the fastenings to become released and in the rare event that such release should occur, the fastenings are so arranged that they do not come in contact with the moving parts or cause any damage. Under the extreme conditions which can occur, there may be a resulting looseness of the stator, but the construction is both so arranged that the stator and/or fastenings cannot move downwardly into contact with the fan, and rotation of the stator with consequent wear is practically impossible.

It is an important advance in view of the vertical position of the tool axis in operation and the position of the fan beneath the motor that the fastenings and other parts cannot, when loosened or broken, be caught in the moving parts or injure the winding.

The form of motor disclosed, is particularly adapted to use in electric tools where a uniform outer contour is required, the stator being held between two end housings which have internal shoulders machined thereon on an axis to correspond to the contour of the stator irons whereby the stator is supported at its circumference and at both ends in these end housings so that endwise movement and rotation of the stator are rendered practically impossible.

In the accompanying drawing, I have illustrated a portable electric tool embodying the features of my invention in the preferred and a modified form. The term portable being used as meaning a tool adapted to be hand supported and hand directed.

Figures 1, 2:
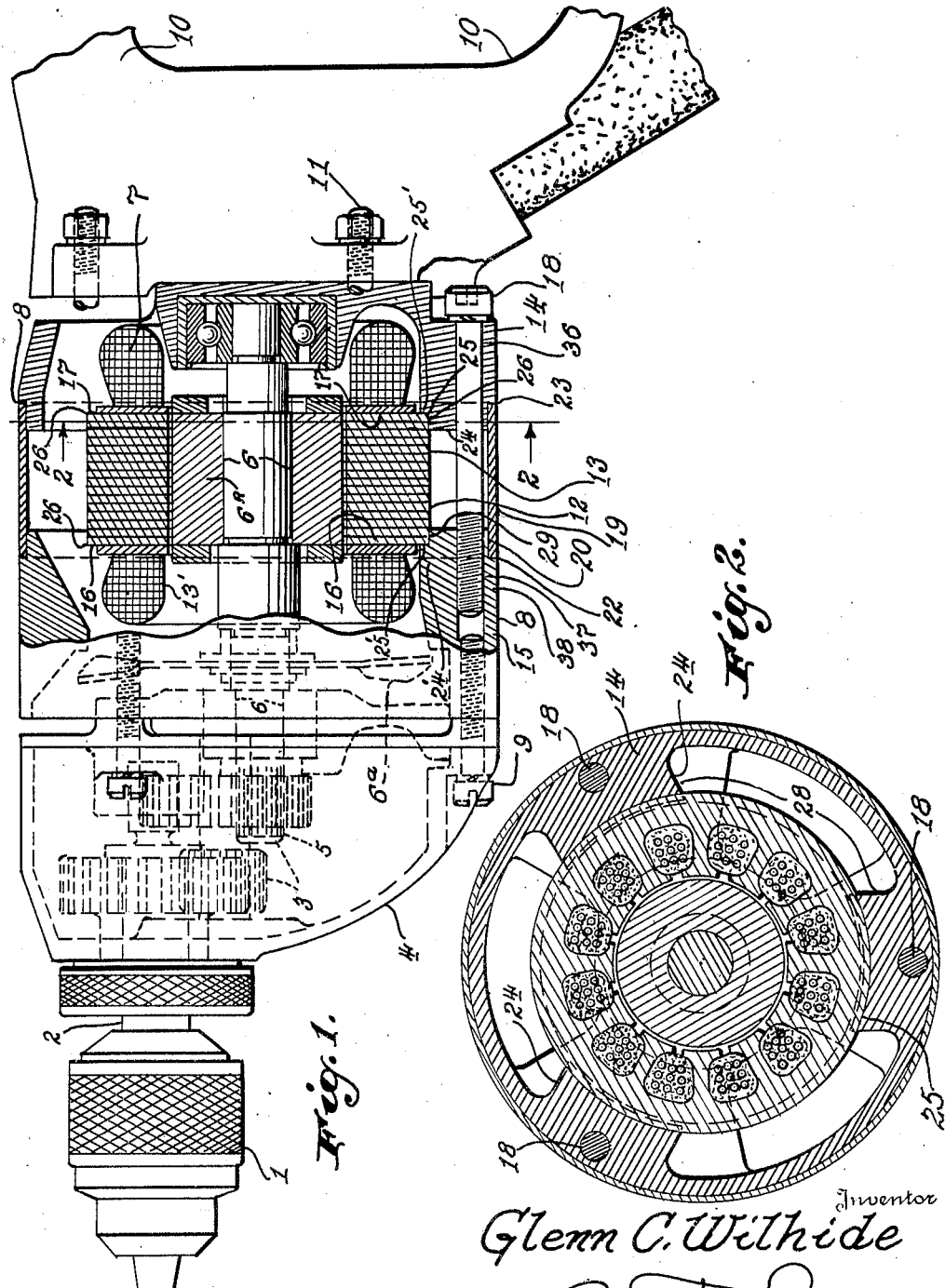
Fig. 1 is a side elevation of an electric drill, equipped with a motor embodying the features of my invention in the first form above mentioned, the central portion of the figure being broken away to show the motor and casing in section on a vertical plane of the axis of the motor, the handle being broken away for convenience of illustration.
Fig. 2 is a section on the line 2—2 in Fig. 1, looking in the direction of the arrows.

Referring to the drawing by numerals each of which is used to indicate the same or similar parts in the different figures, the construction shown in Figs. 1 and 2 is a portable electric tool, the form shown being intended for use as a drill. It has a chuck 1, mounted on a spindle 2, which is operated by reducing gears 3 in the gear casing 4. The reducing gears 3 are operated by a pinion 5 formed on the shaft 6 of the electric motor 7 which is enclosed in the field casing or motor casing 8 and serves as the driving source for the tool, the motor shaft 6 also carries the fan 6—a for cooling the motor. In the construction shown, the details being non-essential, the gear casing 4 is secured to one end of the field or motor casing 8 by means of screws 9 and the grip or spade handle 10 is secured to the other end of this casing by screws or bolts 11.

The invention relates to the portable tool shown and the adaptation thereto of motor 7 and casing 8 and particularly to the manner of securing and mounting the stator 12 in the casing 8 to overcome the difficulties already pointed out.

The construction shown is best adapted for use in portable electric tools, drills or other tools, where a smooth substantially circular outer contour of the motor casing or field casing 8 is desired or required.

In this construction, the stator 12 which in the motor 7 shown includes stator iron or core 13 and coils 13' is held between two relatively short end housings 14 and 15. These housings 14 and 15 bear against the opposite axial end surfaces 16 and 17 of the stator core 13 in a manner to be described. The end housings 14 and 15 are drawn together by bolts 18 extending longitudinally therethrough in the direction of the motor axis and thus the stator core 13 is gripped between the end housings. In the form of the invention shown, there is a space between the respective circular end housings 14 and 15 which is enclosed by a flat sheet metal band or ring 19 which conforms to the peripheral contour of the end housings and rests at its edges 23 in peripheral or circumferential seats or circumferential areas 20 of reduced diameter formed on or in the adjacent ends of the end housings 14 and 15. It is of particular importance that there is a slight space between the lateral edges 23 of the band or ring 19 and the peripheral shoulders 22 where the areas of reduced diameter or seats 20 terminate. This space permits the end housings 14 and 15 to be drawn up tightly against the stator core or iron 13 whereby the stator is firmly gripped and rigidly held in the manner described.

The end faces of the stator iron or core 13 are carefully trued up so as to provide a satisfactory fit of these surfaces 16 and 17 with end housings 14 and 15.

In the form shown the end housings 14 and 15 are provided with three or any suitable number of short projections or lugs 24 and 24', respectively, of similar cross section, adapted to the circumference of the core 13 said lugs being as shown and preferably separated by air spaces or ventilation passages 28. These projections or lugs 24, 24' are machined or bored at their internal end edges to provide arcuate seats or peripheral grooves 25 of angular cross section in which the circumferential outer end edges 26 of the core 13, in the preferred arrangement, fit closely. When the construction is assembled as described with the end edges 26 of the core 13 in seats 25 and screws 18 tightened as described the stator 12 is held against longitudinal or axial and lateral and rotary play, more particularly, stator iron 13 is gripped in the direction of the axis by shoulders 25' and supported circumferentially by the peripheral walls 29 of said grooves 25. The fit of the circumference of stator core or iron 13 against peripheral walls 29 is, to best advantage, such as to hold the stator core in coaxial relation to rotor 6—R and to prevent rotation of the stator even if screws 18 were to become loosened. Primarily the stator core is rigidly clamped by the end thrust of the end housings 14 and 15 due to the tightening of screws 18.

The screws 18 preferably pass through projections or lugs 24 as indicated in Fig. 2, the end housing 14 being bored at 36 to receive the same, and the end housing 15 particularly as to the lugs or projections 24' thereof being bored and threaded at 37 to engage the threaded ends 38 of said screws 18. These screws are wholly outside the stator core or laminations.

I have thus described specifically and in detail the application of the principles of my invention and the manner of constructing, applying, operating and using the same, the description being specific and in detail in order that the manner of constructing, operating and using the invention may be fully understood, however, the specific terms herein are used descriptively rather than in a limiting sense, the scope of the invention being defined in the claims.

What I claim as new and desire to secure by Letters Patent is:

1. A portable electric tool having a field casing adapted for attachment of a gear casing and a handle said casing being adapted to enclose a motor, having a stator with a stator core, said field casing comprising opposite end housings each of said housings having circumferentially spaced arcuate seats adapted to receive the peripheral end edges of the stator core, and means for drawing said end housings together to clamp the stator between the end housings the casing also comprising a peripheral portion between said housings and spaced outwardly from the periphery of the core, providing an air space between said peripheral portion and core, the spaces between said seats being connected to said air space providing ventilating passages for cooling the core.

2. A portable electric tool having a field casing adapted for attachment of a gear casing at one end and a handle at the other end said casing being adapted to enclose a motor having a stator with a stator core, said field casing comprising opposite end housings each of said housings having circumferentially spaced arcuate seats, said seats having surfaces transverse to the axis to engage the end surfaces of the core and circumferential surfaces to engage a circumference of the core near its ends, said seats being adapted to receive the peripheral end edges of the core, ventilating passages between said seats and tension means for drawing said end sections together to clamp the stator between the end housings.

3. A portable electric tool having a field casing adapted for attachment of a gear casing at one end and a handle at the other end said field casing being adapted to enclose a motor having a stator with a stator core, said field casing comprising opposite end housings each of said housings having circumferentially spaced arcuate seats, said seats having surfaces transverse to the axis to engage the end surfaces of the core and lateral surfaces to engage a circumference of the core near its ends, said seats being adapted to receive the peripheral end edges of the core, tension means for drawing said end sections together to clamp the stator between the end housings, which have inwardly projecting lugs supporting the seats, the tension means extending through the lugs parallel to the axis and outside the core.

4. A portable electric tool having a field casing adapted for attachment of a gear casing at one end and a handle at the other end, and adapted to enclose a motor said motor having a stator comprising a stator core, said field casing comprising opposite end housings each of said housings having circumferentially arranged seats, said seats having surfaces transverse to the axis to engage the end surfaces of the core and lateral surfaces to engage the circumference of the core near its ends, said seats being adapted to receive the peripheral end edges of the core, and tension means for drawing said end sections together to clamp the stator between the end housings, each of said housings having inwardly projecting lugs supporting said seats, the tension means comprising bolts extending through said lugs of one said housing in substantial parallelism to the motor axis and threaded into a lug of the other end housing.

5. A portable electric tool having a field casing adapted for attachment thereto of a gear casing and a handle, and adapted to enclose a motor with a stator having a stator core, said casing comprising opposite end housings, each of said housings having means for applying end thrust to the core and also having means for positioning the core laterally to align it with the motor axis and bolts extending through one housing and threaded into the other housing, said bolts being in substantial parallelism with the motor axis for drawing said end housings together to clamp the stator between the respective end housings both of said means having openings and the casing having an air space connecting said openings, providing longitudinal air passages for cooling the core.

6. A portable electric tool having a field casing adapted for attachment thereto of a gear casing and a handle, and adapted to enclose a motor having a rotor, a stator and a stator core, said field casing comprising opposite end housings and core clamping and positioning means in each housing the respective positioning means being adapted to apply opposite end thrust to the core and having means for positioning the respective ends of the core whereby the core axis is aligned with the rotor axis, said end housings being spaced apart, a tubular member closing the space between the end sections, tension means for drawing the end sections together to clamp the core, said tubular member being free of said clamping tension, to avoid interference with the clamping of the core.

7. A portable electric tool having a field casing adapted for attachment thereto, of a gear casing and a handle, and adapted to enclose a motor with a stator having a stator core, said field casing comprising opposite end housings and supporting and positioning means in each housing adapted to apply opposite end thrust to the core and having means to locate the respective ends of the core in correspondence with the alignment of the motor axis, said end housings being spaced apart, a tubular member closing the space between the same, tension means for drawing the end housings together to clamp the core, said tubular member being free of said clamping tension to avoid interference with the clamping of the core, the respective end sections having circumferentially spaced lugs projecting inwardly with the supporting and positioning means for the core formed thereon, the spacing of said lugs providing ventilating passages for cooling the motor.

8. A portable electric tool having a field casing adapted to support at its opposite ends, a gear casing and a handle, said tool having in said field casing a motor with a stator and a stator core, said field casing having inwardly disposed surfaces arranged in correspondence with the circumference of the core and adapted to admit the same and means for contracting the field casing causing said surfaces to grip the core said inwardly disposed surfaces having passages connected to the ends of the casing and spaced about the periphery of the casing, said casing having a peripherally arranged air space around the core, said passages, being connected to said air space providing longitudinally extending ventilating passages for cooling the core.

GLENN C. WILHIDE.